United States Patent
Leung et al.

(10) Patent No.: US 9,076,059 B2
(45) Date of Patent: Jul. 7, 2015

(54) KEY-FRAME SELECTION FOR PARALLEL TRACKING AND MAPPING

(71) Applicant: CANON KABUSHIKI KAISHA, Tokyo (JP)

(72) Inventors: Ka-Ming Leung, Marsfield (AU); Simon John Liddington, Drummoyne (AU)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 13/706,217

(22) Filed: Dec. 5, 2012

(65) Prior Publication Data

US 2013/0148851 A1 Jun. 13, 2013

(30) Foreign Application Priority Data

Dec. 12, 2011 (AU) ................................ 2011253973

(51) Int. Cl.
*G06K 9/00* (2006.01)
*G06K 9/32* (2006.01)
*G06T 7/00* (2006.01)

(52) U.S. Cl.
CPC ............ *G06K 9/3241* (2013.01); *G06K 9/3216* (2013.01); *G06K 2009/3225* (2013.01); *G06T 7/0044* (2013.01); *G06T 7/0071* (2013.01); *G06T 7/0075* (2013.01); *G06T 2207/10016* (2013.01); *G06T 2207/10021* (2013.01); *G06T 2207/30208* (2013.01)

(58) Field of Classification Search
USPC ........................................................ 382/154
See application file for complete search history.

(56) References Cited

U.S. PATENT DOCUMENTS

| 6,728,582 B1 * | 4/2004 | Wallack ........................ 700/64 |
| 6,970,591 B1 | 11/2005 | Lyons | |
| 2003/0016852 A1 * | 1/2003 | Kaufman et al. ............. 382/131 |
| 2009/0243889 A1 | 10/2009 | Suhr | |
| 2010/0080447 A1 * | 4/2010 | Kanazawa et al. ............ 382/154 |

FOREIGN PATENT DOCUMENTS

EP 2157545 A1 2/2010

OTHER PUBLICATIONS

Subbarao et al., "A Balanced Approach to 3D Tracking from Image Streams," Journal article in Proceedings of the International Symposium on Mixed and Augmented Reality, Oct. 5-8, 2005, pp. 70-78, volume ISMAR 2005, 1st edition, IEEE Computer Society Press, Washington, DC, USA.

(Continued)

*Primary Examiner* — Alex Liew
(74) *Attorney, Agent, or Firm* — Canon USA, Inc., IP Division

(57) ABSTRACT

A method of selecting a first image from a plurality of images for constructing a coordinate system of an augmented reality system. A first image feature in the first image corresponding to the feature of the marker is determined. A second image feature in a second image is determined based on a second pose of a camera, said second image feature having a visual match to the first image feature. A reconstructed position of the feature of the marker in a three-dimensional (3D) space is determined based on positions of the first and second image features, the first and the second camera pose. A reconstruction error is determined based on the reconstructed position of the feature of the marker and a pre-determined position of the marker.

18 Claims, 11 Drawing Sheets

(56) References Cited

OTHER PUBLICATIONS

Gibson et al., "Accurate Camera Calibration for Off-line, Video-based Augmented Reality," In Proceedings of IEEE and ACM International Symposium on Mixed and Augmented Reality (ISMAR 2002), Proceedings from Proceedings of IEEE and ACM International Symposium on Mixed and Augmented Reality (ISMAR 2002, Darmstadt, Germany, Sep. 2002; IEEE: USA, Sep. 2002; p. 37-46 (Document pp. 1-10).

Pollefeys et al., "Video-to-3D," In Proceedings of Photogrammetric Computer Vision (PCV02), Proceedings from Proceedings of Photogrammetric Computer Vision (PCV02), Graz, Austria, Sep. 2002; ISPRS: Sep. 2002; p. 252-258.

Klein et al., "Parallel Tracking and Mapping on a Camera Phone," In International Symposium on Mixed and Augmented Reality (ISMAR'09), Proceedings from International Symposium on Mixed and Augmented Reality (ISMAR'09), Orlando, Florida, Oct. 2009; Jannick P. Rolland, Ed. IEEE: USA, Oct. 2009; p. 83-86.

Beder et al., "Determining an Initial Image Pair for Fixing the Scale of a 3D Reconstruction from an Image Sequence," 28th DAGM Symposium, Berlin, Germany, Sep. 12-14, 2006. Proceedings, pp. 657-666, Print ISBN 978-3-540-44412-1.

\* cited by examiner

2D Marker

3D Marker

KEY-FRAME SELECTION FOR PARALLEL TRACKING AND MAPPING

REFERENCE TO RELATED PATENT APPLICATION(S)

This application claims the benefit under 35 U.S.C. §119 of the filing date of Australian Patent Application No. 2011253973, filed 12 Dec. 2011, hereby incorporated by reference in its entirety as if fully set forth herein.

FIELD OF INVENTION

The present invention relates generally to augmented reality (AR) systems and, in particular, to the selection of key-frames from an image sequence for use in accurate and reliable map generation and camera position determination. The present invention also relates to a method and apparatus for selecting a first image from a plurality of images for use in constructing a coordinate system of an augmented reality system. The present invention also relates to a computer program product including a computer readable medium having recorded thereon a computer program for selecting a first image from a plurality of images for use in constructing a coordinate system of an augmented reality system.

DESCRIPTION OF BACKGROUND ART

Augmented reality (AR) is a field of computer research which deals with the combination of real world and computer-generated data, where computer graphics objects are blended into real footage in real time. The majority of augmented reality image capturing systems operate with predetermined information about the environment of a user (i.e. in some form of map). The user is allowed to interact with the environment based on the predetermined information. If the map provided is comprehensive, registration can be performed directly from the map, which is a common method used in camera-based augmented reality tracking. Unfortunately, creating a comprehensive map is difficult and time-consuming. Such a map is often created manually by trained technicians, and the map is generally not sufficiently accurate unless the map is optimized by a minimisation method which is again computationally expensive.

Parallel tracking and mapping (PTAM) is an algorithm, particularly used in handheld devices such as a camera, to perform real-time tracking in scenes without the need of any prior map. A user may first place such a camera above a workspace to be tracked and press a key to select an initial keyframe for map initialisation. Typically, about one thousand (1000) natural features are extracted from the initial keyframe and tracked across subsequent frames. The user may then smoothly translate the camera to a slightly offset position and make a second key-press to provide a second keyframe. A known five-point-pose algorithm may then be used to estimate relative camera pose and triangulate the initial map using the selected key-frames and tracked feature correspondences.

One disadvantage of the five-point-pose algorithm is the requirement for human interactions during map initialisation. Some users do not understand a stereo baseline requirement required for triangulation and attempt to initialise a camera or the like using pure rotation. In addition, the five-point-pose algorithm also requires long uninterrupted tracked features. Any unintentional camera rotation and drastic camera motion may cause feature matching to fail, leaving few tracked features for map initialisation. Another method of performing real-time tracking in scenes assumes a user is initially viewing a planar scene. As the user moves a camera after selecting an initial keyframe, homography hypotheses between a current frame and an initial keyframe are generated at each frame from matched features. Each homography hypothesis is then decomposed into two or more possible three-dimensional (3D) camera poses. A second keyframe is selected based on a condition number. The condition number is the ratio of minimum to maximum eigenvalues of information matrix $J^T J$, where J is the Jacobian matrix of partial derivatives of each points' projection with respect to eight (8) degrees of freedom (DOF) changes to decomposition. Such a method is also not optimal since the condition number only gives indication of the scale of the errors with respect to parameters in the decomposition and does not relate directly to accuracy of 3D map points.

Another method of performing real-time tracking in scenes is a model-based method, based on the Geometric Robust Information Criterion (GRIC) model. In such a model-based method, a GRIC score is computed based on feature correspondences between an initial keyframe and a current frame. For each frame, a score is computed for each of two models (i.e., epi-polar and homography). The homography model best describes the correspondences for stereo images with a small baseline. The epi-polar model takes scene geometry into account but requires a larger baseline. A second keyframe is selected when the GRIC score of the epi-polar model is lower than the GRIC score of the homography model. However, such model-based methods require long continuous uninterrupted tracked features and computation of re-projection errors for each tracked feature for both homography and epi-polar models, which can be computationally expensive.

Other methods of performing real-time tracking in scenes make an implicit assumption that a sufficiently accurate initial 3D map can be created when either temporal distance between two keyframes or track length of tracked features is larger than a fixed threshold. Such assumptions are often incorrect since distance of the features from a camera affects required distance between keyframes.

SUMMARY OF THE INVENTION

It is an object of the present invention to substantially overcome, or at least ameliorate, one or more disadvantages of existing arrangements.

According to one aspect of the present disclosure there is provided a method of selecting a first image from a plurality of images for constructing a coordinate system of an augmented reality system along with a second image, said method comprising:

determining a first image feature in the first image corresponding to the feature of the marker associated with the first image, the first image feature being determined based on a first pose of a camera used to capture the first image;

determining a second image feature in a second image based on a second pose of a camera used to capture the second image, said second image feature having a visual match to the first image feature;

determining a reconstructed position of the feature of the marker based on positions of the first and second image features, the first camera pose and the second camera pose;

determining a reconstruction error based on the reconstructed position of the feature of the marker and a predetermined position of the marker; and selecting the first image for constructing the coordinate system of the augmented reality system in an event that the determined reconstruction error indicates that the first pose and the second pose of cameras capturing said first and second images satisfies a pre-determined criterion for scene reconstruction.

According to another aspect of the present disclosure there is provided an apparatus for selecting a first image from a plurality of images, said apparatus comprising:

means for determining a first image feature in the first image corresponding to the feature of a marker associated with the first image, the first image feature being determined based on a first pose of a camera used to capture the first image;

means for determining a second image feature in a second one of the plurality of images based on a second pose of a camera used to capture the second image, said second image feature having a visual match to the first image feature;

means for determining a reconstructed position of the feature of the marker based on positions of the first and second image features, the first camera pose and the second camera pose;

means for determining a reconstruction error based on the reconstructed position of the feature of the marker and a pre-determined position of the marker; and means for selecting the first image for constructing a coordinate system of an augmented reality system in an event that the determined reconstruction error indicates that the first pose and the second pose of cameras capturing said first and second images satisfies a pre-determined criterion for scene reconstruction.

According to still another aspect of the present disclosure there is provided a system for selecting a first image from a plurality of images, said system comprising:

a memory for storing data and computer program;

a processor coupled to said memory for executing said computer program, said computer program comprising instructions for:

determining a first image feature in the first image corresponding to the feature of a marker associated with the first image, the first image feature being determined based on a first pose of a camera used to capture the first image;

determining a second image feature in a second one of the plurality of images based on a second pose of a camera used to capture the second image, said second image feature having a visual match to the first image feature;

determining a reconstructed position of the feature of the marker based on positions of the first and second image features, the first camera pose and the second camera pose;

determining a reconstruction error based on the reconstructed position of the feature of the marker; and selecting the first image for constructing a coordinate system of an augmented reality system in an event that the determined reconstruction error indicates that the first pose and the second pose of cameras capturing said first and second images satisfies a pre-determined criterion for scene reconstruction.

According to still another aspect of the present disclosure there is provided a computer readable medium having a computer program recorded thereon for selecting a first image from a plurality of images, said program comprising:

code for determining a first image feature in the first image corresponding to the feature of a marker associated with the first image, the first image feature being determined based on a first pose of a camera used to capture the first image;

code for determining a second image feature in a second one of the plurality of images based on a second pose of a camera used to capture the second image, said second image feature having a visual match to the first image feature;

code for determining a reconstructed position of the feature of the marker based on positions of the first and second image features, the first camera pose and the second camera pose;

code for determining a reconstruction error based on the reconstructed position of the feature of the marker; and code for selecting the first image for constructing a coordinate system of an augmented reality system in an event that the determined reconstruction error indicates that the first pose and the second pose of cameras capturing said first and second images satisfies a pre-determined criterion for scene reconstruction.

According to still another aspect of the present disclosure there is provided a method of selecting a first image from a plurality of images captured by a multi-view camera system comprising a plurality of cameras, said method comprising:

determining a first image feature in the first image corresponding to the feature of a marker associated with the first image, the first image feature being determined based on a first pose of a camera used to capture the first image;

determining a second image feature in a second one of the plurality of images based on a second pose of a camera used to capture the second image, said second image feature having a visual match to the first image feature;

determining a reconstructed position of the feature of the marker based on positions of the first and second image features, the first camera pose and the second camera pose;

determining a reconstruction error based on the reconstructed position of the feature of the marker; and selecting the first image for constructing a coordinate system of an augmented reality system in an event that the determined reconstruction error indicates that the first pose and the second pose of cameras capturing said first and second images satisfies a pre-determined criterion for scene reconstruction.

According to still another aspect of the present disclosure there is provided an apparatus for selecting a first image from a plurality of images captured by a multi-view camera system comprising a plurality of cameras, said apparatus comprising:

means for determining a first image feature in the first image corresponding to the feature of a marker associated with the first image, the first image feature being determined based on a first pose of a camera used to capture the first image;

means for determining a second image feature in a second one of the plurality of images based on a second pose of a camera used to capture the second image, said second image feature having a visual match to the first image feature;

means for determining a reconstructed position of the feature of the marker based on positions of the first and second image features, the first camera pose and the second camera pose;

means for determining a reconstruction error based on the reconstructed position of the feature of the marker; and means for selecting the first image for constructing a coordinate system of an augmented reality system in an event that the determined reconstruction error indicates that the first pose and the second pose of cameras capturing said first and second images satisfies a pre-determined criterion for scene reconstruction.

According to still another aspect of the present disclosure there is provided a system for selecting a first image from a plurality of images captured by a multi-view camera system comprising a plurality of cameras, said system comprising:

a memory for storing data and computer program;

a processor coupled to said memory for executing said computer program, said computer program comprising instructions for:

determining a first image feature in the first image corresponding to the feature of a marker associated with the first image, the first image feature being determined based on a first pose of a camera used to capture the first image;

determining a second image feature in a second one of the plurality of images based on a second pose of a camera used to capture the second image, said second image feature having a visual match to the first image feature;

determining a reconstructed position of the feature of the marker based on positions of the first and second image features, the first camera pose and the second camera pose;

determining a reconstruction error based on the reconstructed position of the feature of the marker; and selecting the first image for constructing a coordinate system of an augmented reality system in an event that the determined reconstruction error indicates that the first pose and the second pose of cameras capturing said first and second images satisfies a pre-determined criterion for scene reconstruction.

According to still another aspect of the present disclosure there is provided a computer readable medium having a computer program recorded thereon for selecting a first image from a plurality of images captured by a multi-view camera system comprising a plurality of cameras, said program comprising:

code for determining a first image feature in the first image corresponding to the feature of a marker associated with the first image, the first image feature being determined based on a first pose of a camera used to capture the first image;

code for determining a second image feature in a second one of the plurality of images based on a second pose of a camera used to capture the second image, said second image feature having a visual match to the first image feature;

code for determining a reconstructed position of the feature of the marker based on positions of the first and second image features, the first camera pose and the second camera pose;

code for determining a reconstruction error based on the reconstructed position of the feature of the marker; and code for selecting the first image for constructing a coordinate system of an augmented reality system in an event that the determined reconstruction error indicates that the first pose and the second pose of cameras capturing said first and second images satisfies a pre-determined criterion for scene reconstruction.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1A:
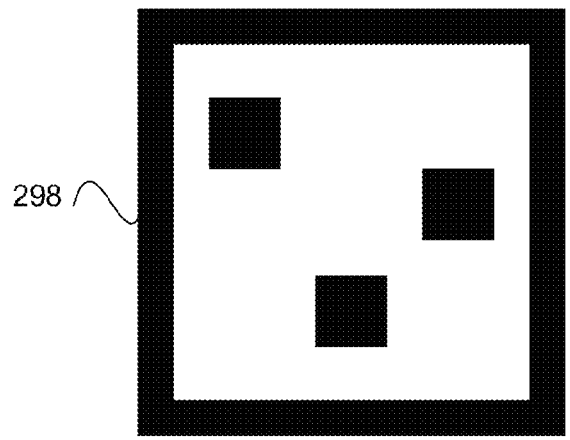
FIG. 1A is a diagram of a 2D calibration marker pattern used by augmented reality systems.

Where reference is made in any one or more of the accompanying drawings to steps and/or features, which have the same reference numerals, those steps and/or features have for the purposes of this description the same function(s) or operation(s), unless the contrary intention appears.

Figure 2A:
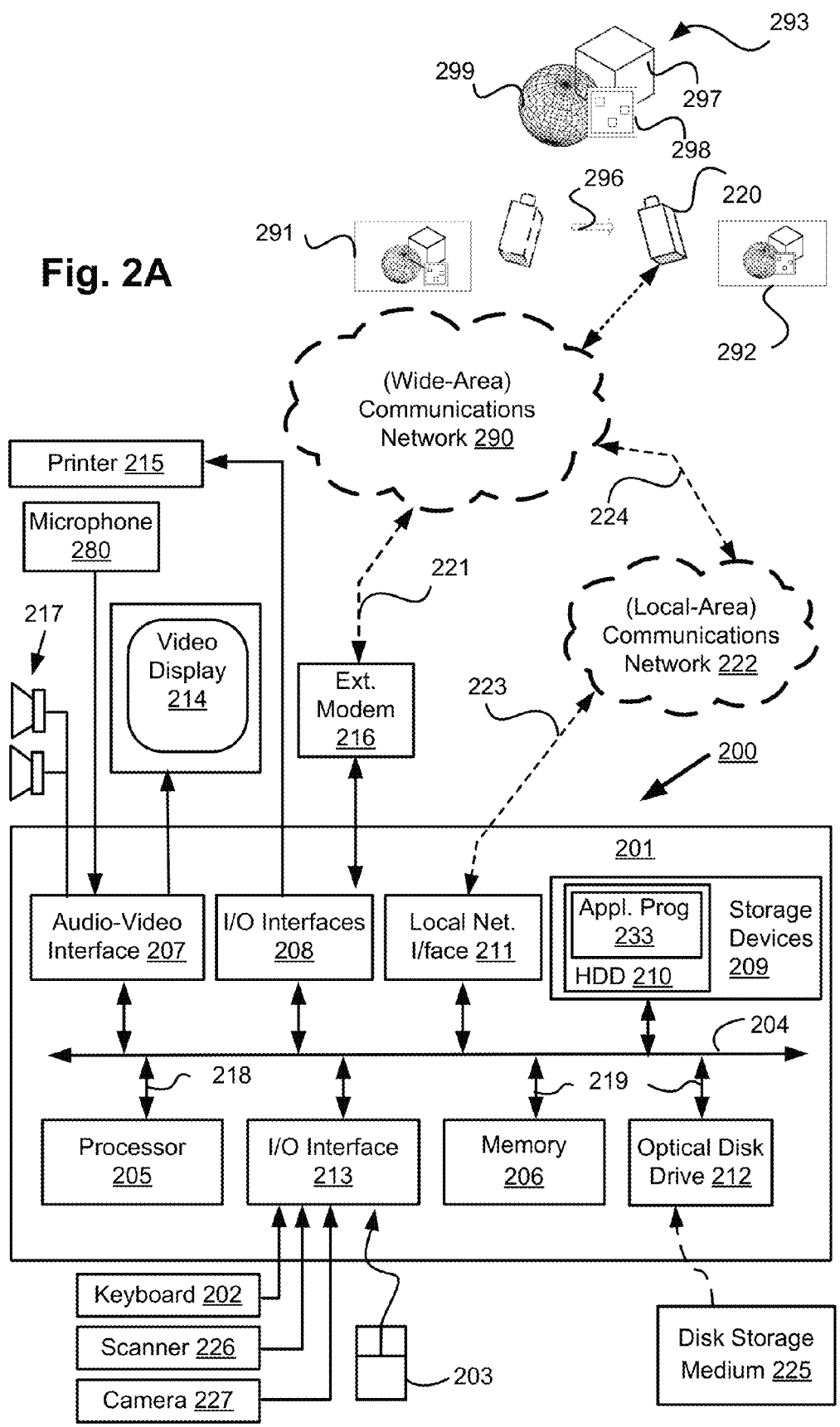
FIGS. 2A and 2B form a schematic block diagram of a video system upon which arrangements described may be practiced.

FIG. 2A shows a video system 200. The video system 200 comprises a moving camera 220 for capturing images of, for example, a scene 293. The scene 293 is static. The moving camera 220 is connected to a communications network 290. The communications network 290 may be a wide-area network (WAN), such as the Internet, a cellular telecommunications network, or a private WAN.

As seen in FIG. 2A, the video system 200 also includes: a computer module 201; input devices such as a keyboard 202, a mouse pointer device 203, a scanner 226 and a microphone 280; and output devices including a printer 215, a display device 214 and loudspeakers 217.

An external Modulator-Demodulator (Modem) transceiver device 216 may be used by the computer module 201 for communicating to and from the communications network 290 via a connection 221. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 290.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer module 201 via connection 223 to a local-area communications network 222, known as a Local Area Network (LAN).

As illustrated in FIG. 2A, the local communications network 222 may also couple to the wide network 290 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the video system 200.

The components 205 to 213 of the computer module 201 typically communicate via an interconnected bus 204 and in a manner that results in a conventional mode of operation of the video system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or alike computer systems.

Methods described below may be implemented using the video system 200 wherein the processes of FIGS. 1 to 6, to be described, may be implemented as one or more software application programs 233 executable within the video system 200. In particular, the steps of the described method are effected by instructions 231 (see FIG. 2B) in the software 233 that are carried out within the video system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 233 is typically stored in the HDD 210 or the memory 206. The software is loaded into the video system 200 from the computer readable medium, and then executed by the video system 200. Thus, for example, the software 233 may be stored on an optically readable disk storage medium (e.g., CD-ROM) 225 that is read by the optical disk drive 212. A computer readable medium having such software or computer program recorded on the computer readable medium is a computer program product. The use of the computer program product in the computer system 200 preferably effects an advantageous apparatus for implementing the described methods.

In some instances, the application programs 233 may be supplied to the user encoded on one or more CD-ROMs 225 and read via the corresponding drive 212, or alternatively may be read by the user from the networks 290 or 222. Still further, the software can also be loaded into the video system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the video system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
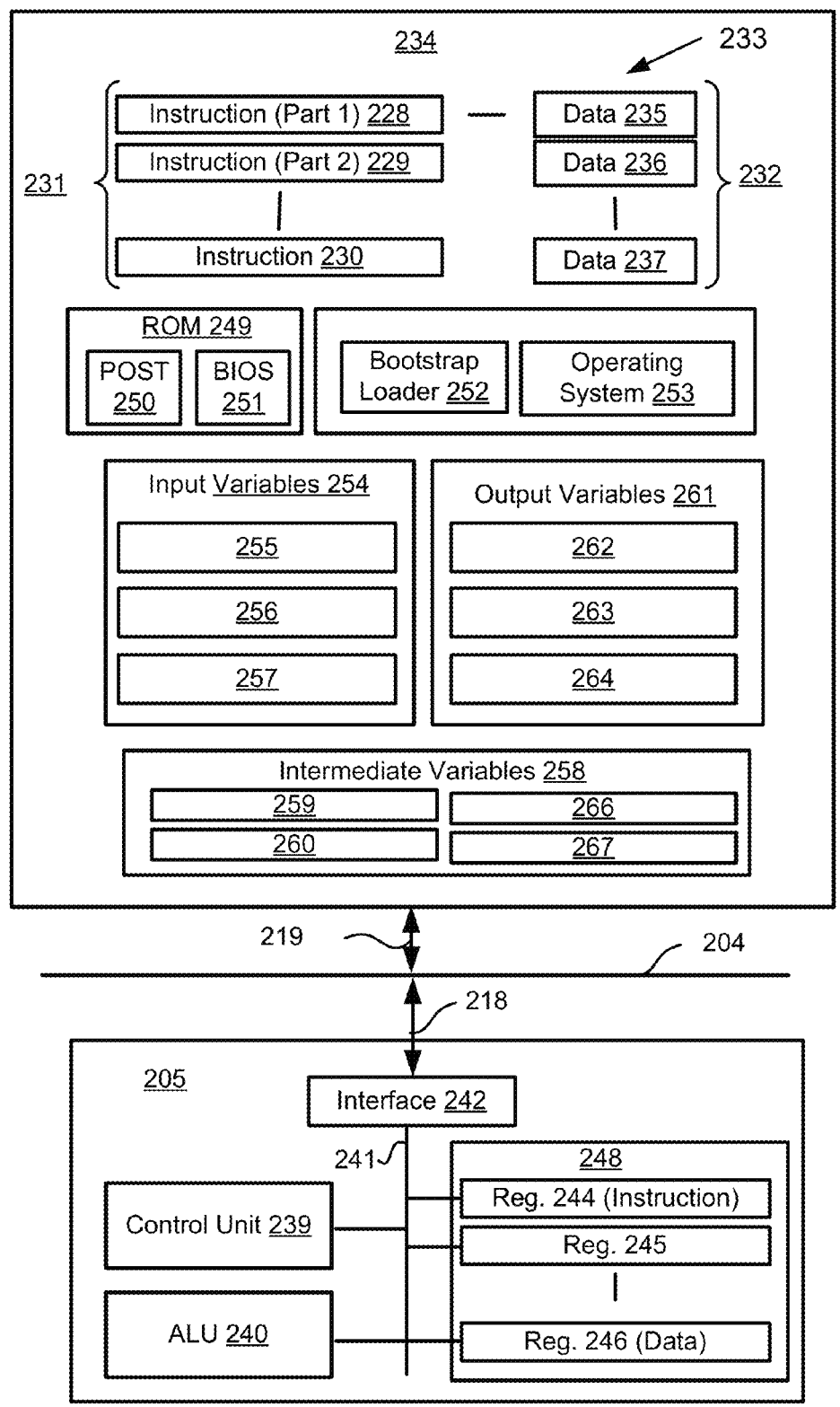

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A is used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically include a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 290, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The described arrangements use input variables 254, which are stored in the memory 234 in corresponding memory locations 255, 256, 257. The described arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 4A:
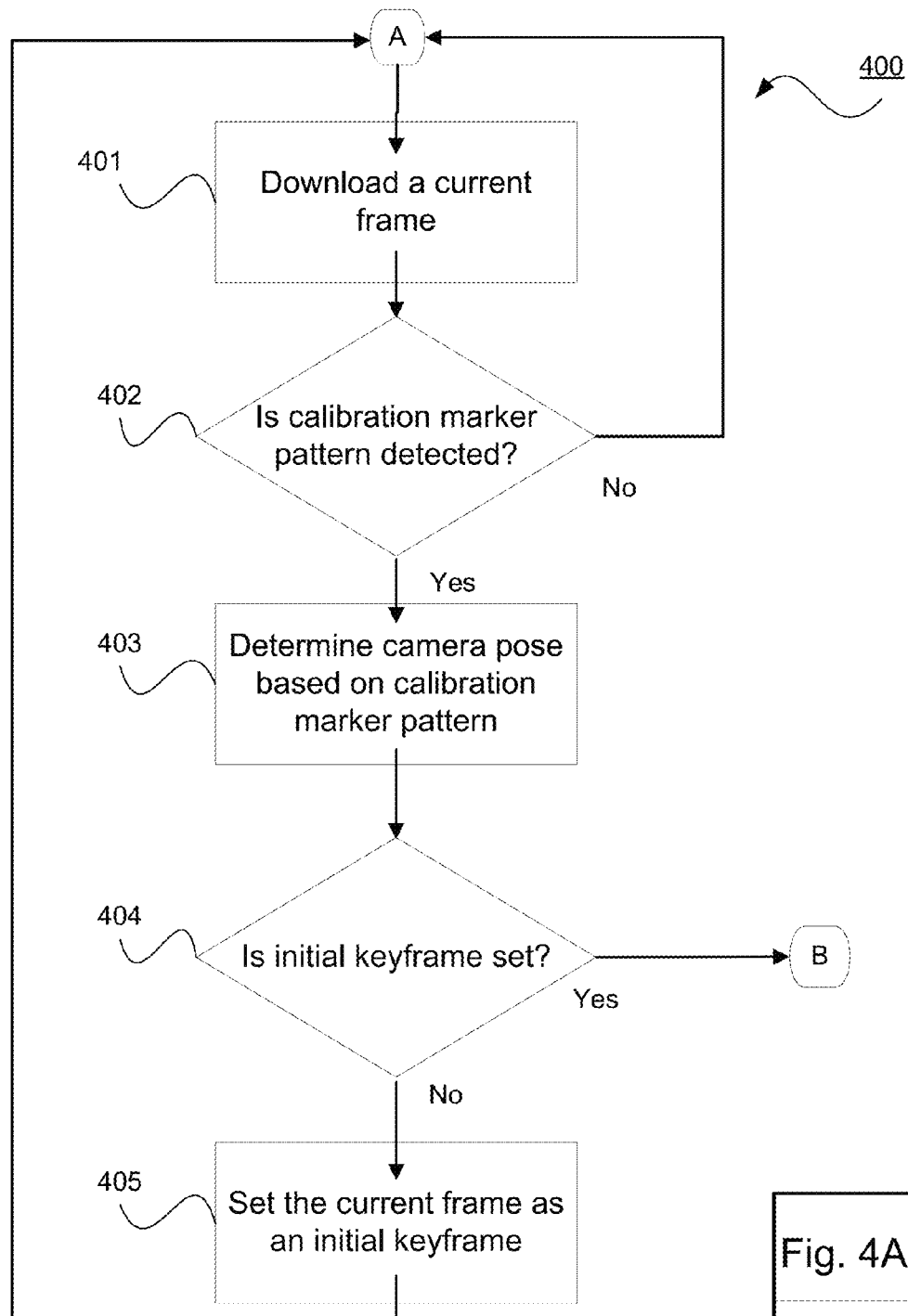
FIGS. 4A, 4B and 4C form a schematic flow diagram showing a method of selecting a keyframe from a plurality of images.
Figure 4B:
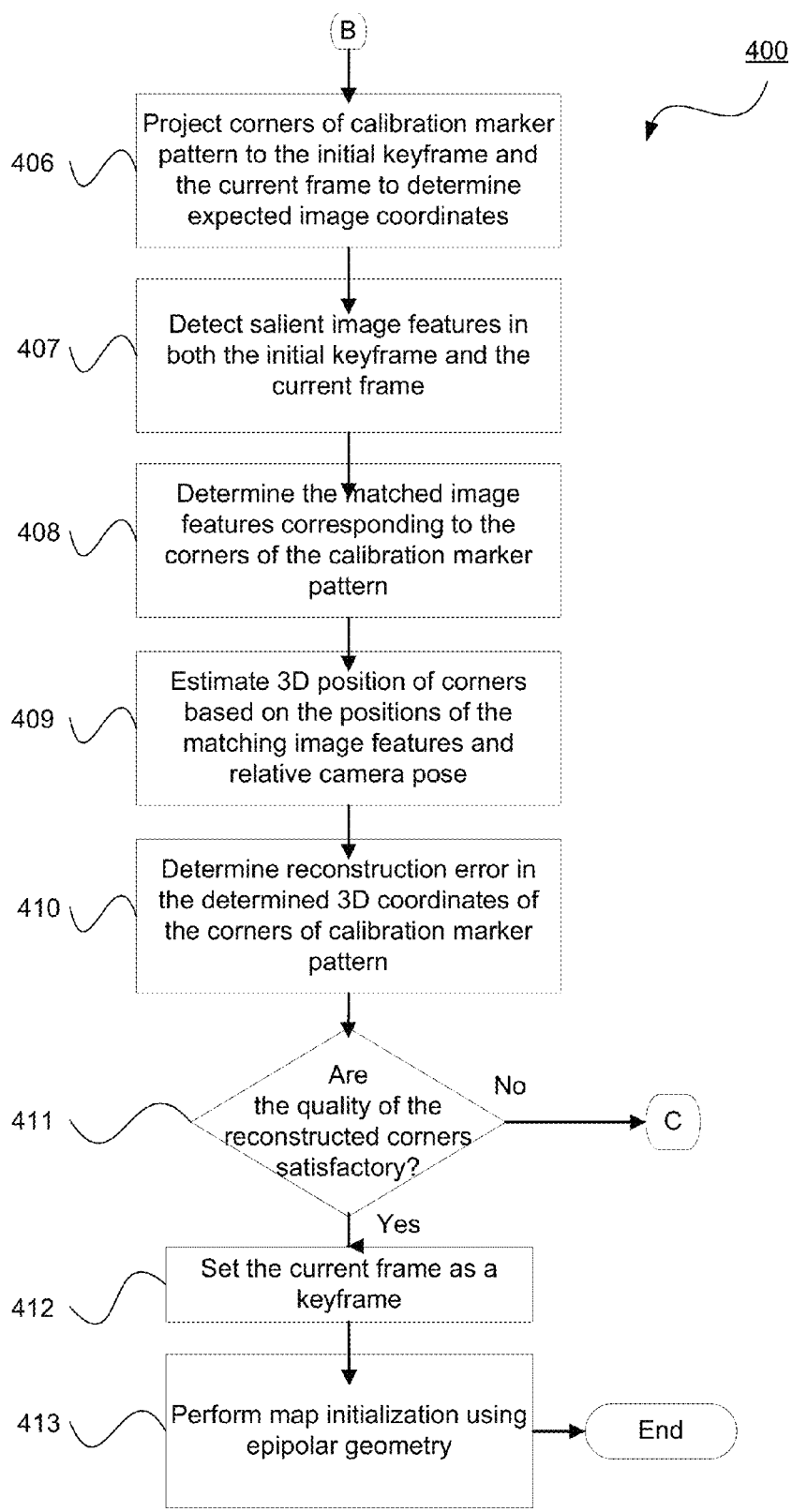
Figure 4C:
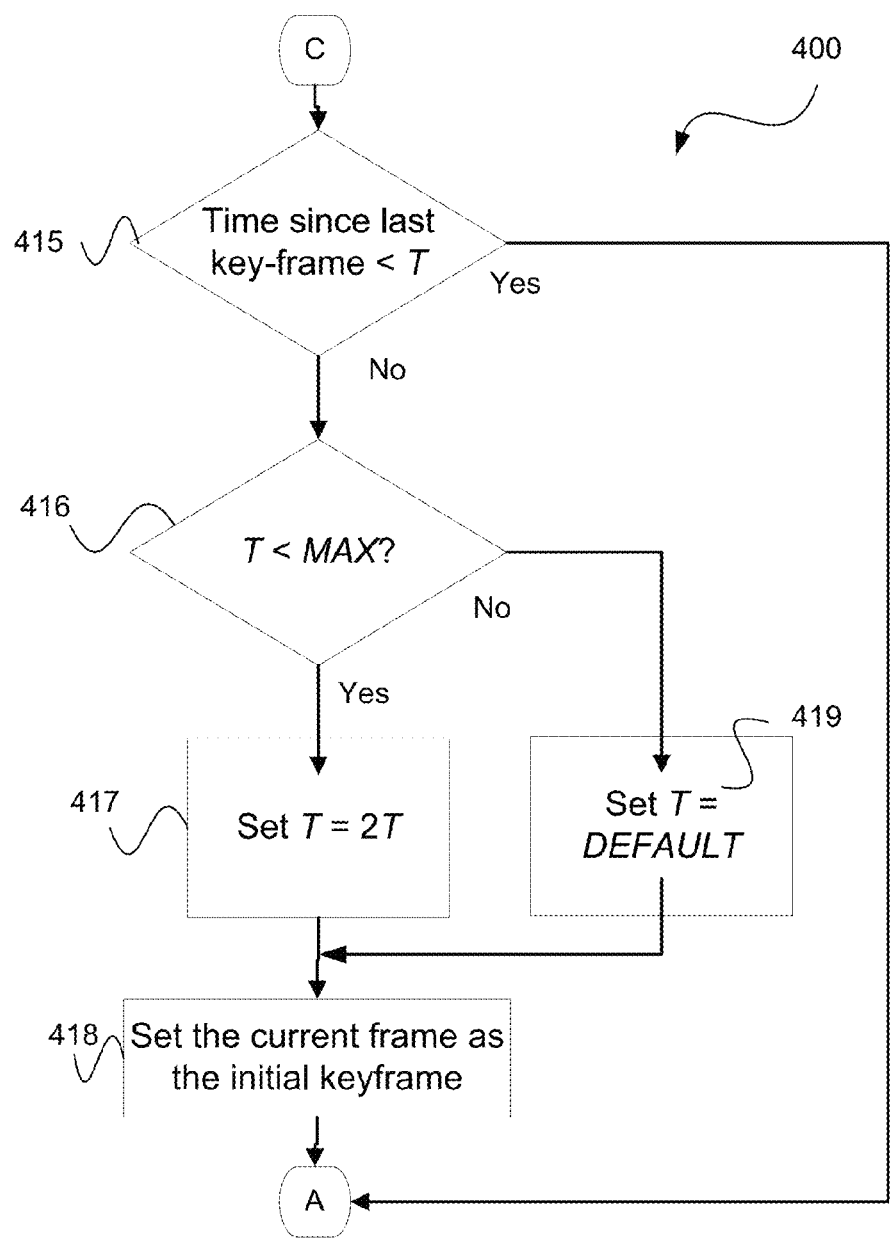
Figure 5:
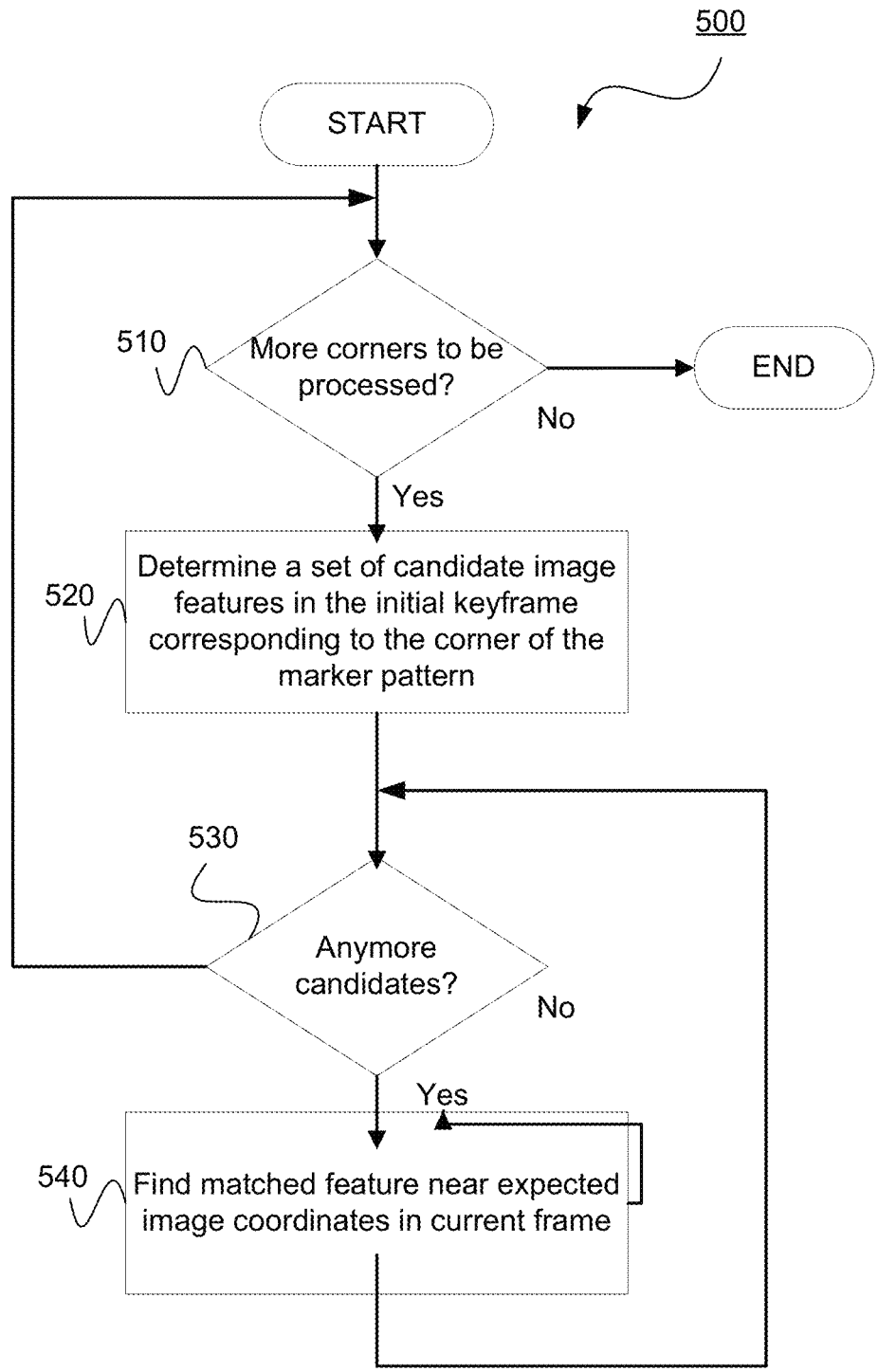
FIG. 5 is a schematic flow diagram showing a method of determining matched image features, as executed in the method of FIG. 4.
Figure 6:
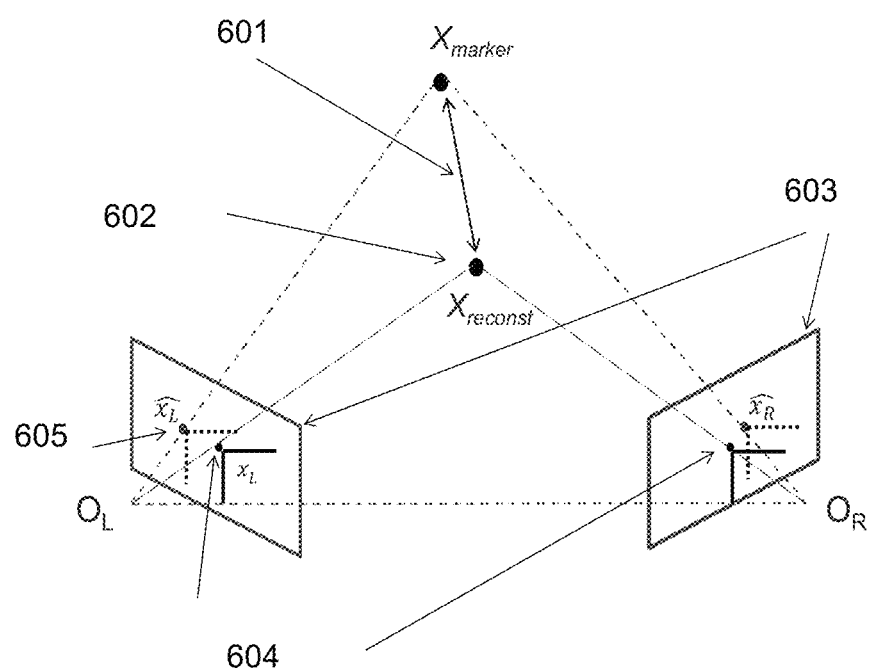
FIG. 6 is a diagram showing reconstruction error of a corner point of a calibration marker pattern in accordance to this invention.

Each step or sub-process in the processes of FIGS. 4 to 6 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The described methods may alternatively be implemented in dedicated hardware such as one or more integrated circuits performing the functions or sub functions of described methods. Such dedicated hardware may include field-programmable gate arrays (FPGA), application-specific integrated circuits (ASIC), graphic processors, digital signal processors, or one or more microprocessors and associated memories. The dedicated hardware may also include devices embedded within the cameras 220, 220A to 220E which would otherwise have comparable functions to the arrangements performed solely in software executed within the computer module 201.

In one arrangement, the described methods may be implemented as software being executed by a processor of one or more of the cameras 220, 220A to 220E, or may be implemented using dedicated hardware within the cameras. In a still alternative arrangement, the described methods may be implemented using a hybrid arrangement of software and hardware modules.

In the example of FIG. 2A, the scene 293 in a three-dimensional (3D) space comprises a 3D spherical object 299, a 3D square object 297 and a calibration marker pattern 298.

Figure 1B:
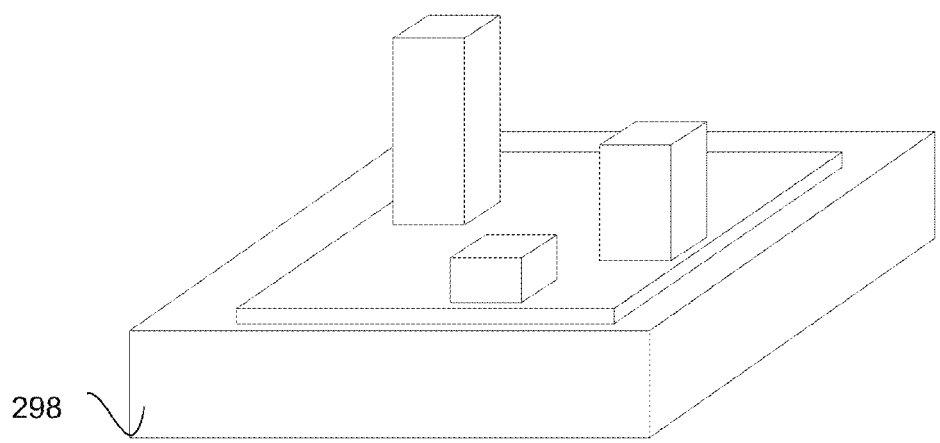
FIG. 1B is a diagram of a 3D calibration marker pattern used by augmented reality systems.

The calibration marker pattern 298 may be a 2D calibration marker pattern as shown in FIG. 1A, which may be used for augmented reality systems. Alternatively, the calibration marker pattern 298 may be a 3D calibration marker pattern as shown in FIG. 1B. Again, the 3D calibration marker pattern of FIG. 1B may be used for augmented reality systems.

The calibration marker pattern 298 defines the scale of captured objects and the origin of a global coordinate system in the scene 293. The calibration marker pattern 298 is assumed to be visible by the moving camera 220 initially for the purpose of map initialisation and is not required for later tracking and mapping operations. The calibration marker pattern 298 is not limited to the 2D and 3D calibration marker patterns shown in FIGS. 1A and 1B, respectively. The calibration marker pattern 298 may be of any type or shape as long as the calibration marker pattern 298 is fixed at known location and dimensions in space and is detectable in the captured image.

In one arrangement, the moving camera 220 is a digital still-image camera capturing images of the scene 293. In an alternative arrangement, the moving camera 220 is a digital video camera capturing images of the scene 293 in the 3D space continuously at a pre-determined frame rate. In a further arrangement, the camera 220 is a multi-lens camera system such as a stereo camera. In yet another arrangement, a multi-view camera system comprising two or more separate cameras may be used to capture the images of the scene.

The moving camera 220 may be calibrated using any suitable camera calibration algorithm for determining camera intrinsic parameters. The camera intrinsic parameters, such as focal length, principal points and lens distortion parameters, may be pre-determined for the moving camera 220. The moving camera 220 is at an initial location, denoted by the camera 220 in dotted lines, with respect to the scene 293. As seen in FIG. 2A, captured image 291 represents a view of the scene 293 as captured by the camera 220 when at the initial location. The moving camera 220 may then be moved, as represented by arrow 296, to a new location as denoted by the camera 220 in solid lines, where the new location is different from the initial location. For clarity, the moving camera 220 shown in solid lines represents the same moving camera 220 shown in dotted lines after the moving camera 220 is moved from the initial location to a new location. As seen in FIG. 2B, captured image 292 represents a view of the scene 293 as captured by the camera 220 at the new location.

The images 291 and 292 may be downloaded sequentially, using the processor 205, from the moving camera 220 to the computer module 201, via the communications network 290. Alternatively, upon being captured, the images 291 and 292 may be sent to the computer module 201 by the camera 220.

The computer module 201 receives the input images 291 and 292 captured by the moving camera 220, via the network 290. The images 291 and 292 may be stored within the memory 206 and/or the hard disk drive 210. One or more keyframes (or key images) may be selected from the images 291 and 292 in accordance with a method 400 which will be described in detail below with reference to FIGS. 4A, 4B and 4C.

Figure 7:
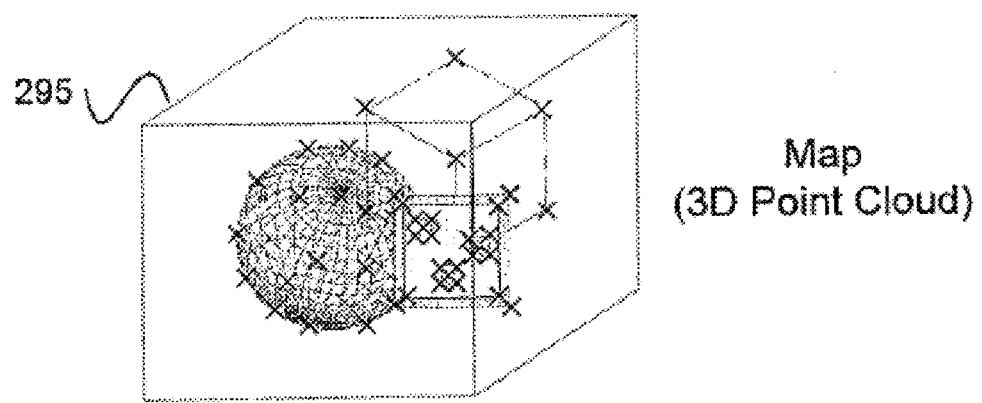
FIG. 7 shows an example of a three dimensional (3D) map generated in accordance with the method of FIG. 4.

In accordance with the method 400, expected quality of a three dimensional (3D) map 295, as seen in FIG. 7, to be generated using the images 291 and 292, is determined. If the expected quality of the 3D map 295 is better than a pre-determined accuracy, the two images 291 and 292 are set as keyframes (or key images) and triangulation is performed using extracted match points from the keyframes (key images) to generate the 3D map 295. If the expected quality of the 3D map 295 is unsatisfactory, then the method 400 is re-executed using a different initial keyframe (key image).

Figure 3:
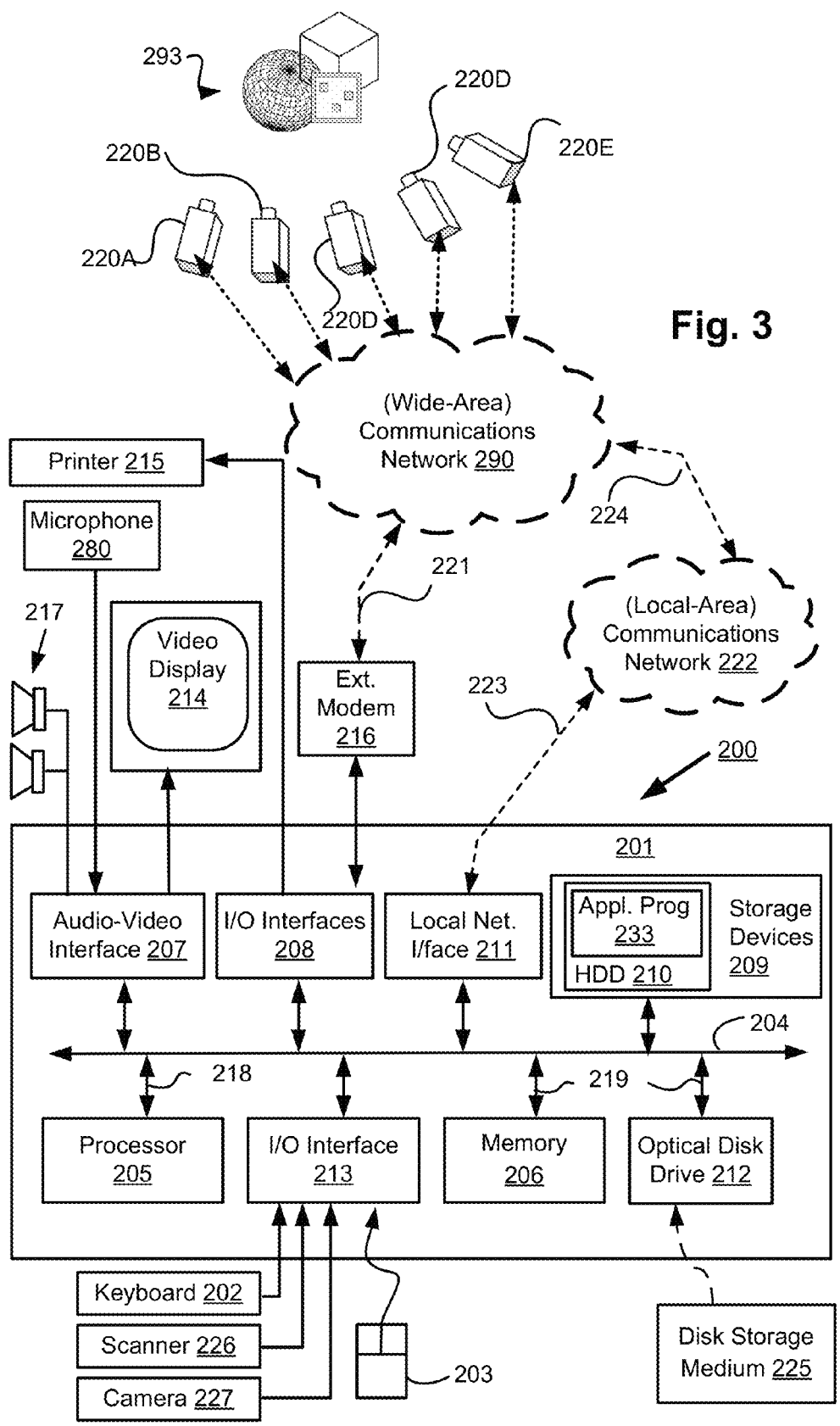
FIG. 3 is a schematic block diagram of an alternative configuration of the video system of FIGS. 2A and 2B, upon which arrangements described may be practiced.

FIG. 3 shows an alternative configuration of the video system 200, where the system 200 comprises multiple stationary cameras 220A, 220B, 220C, 220D, and 220E connected to the network 290. Each stationary camera 220A, 220B, 220C, 220D or 220E operates independently. Images of the scene 293, similar to the images 291 and 292, captured by each camera 220A to 220E may be downloaded to the computer module 201 and be processed in accordance with the method 400.

The method 400 of selecting a keyframe (key image) from a plurality of images will now be described in detail with reference to FIGS. 4A, 4B and 4C. The method 400 will be described by way of example with reference to the images 291 and 292 of FIG. 2A captured by the moveable camera 220. The method 400 may be implemented as one or more code modules of the software application program 233 resident in the hard disk drive 210 and being controlled in its execution by the processor 205.

As seen in FIG. 4A, the method 400 begins at image download step 401, where the processor 205 is used to download a current frame from the moving camera 220, via the network 290. In accordance with the present example of FIG. 2A, in the first iteration of the method 400, the current frame is the image 291, which is a raw image ready to be processed in accordance with the method 400. As described above, the downloaded image 291 may be stored within the memory 206 and/or the hard disk drive 210.

In an alternative arrangement, the images 291 and 292 may be compressed by the moving camera 220 using a conventional coding scheme, such as JPEG, JPEG2000, Motion JPEG2000, MPEG1, MPEG2, MPEG4 and H.264. In such an alternative arrangement, the method 400 may include a step to decode the images 291 and 292 to generate raw pixel data.

In decision step 402, the processor 205 is used to detect the presence of a calibration marker pattern 298 in the current frame (e.g., image 291). If the calibration marker pattern 298 is detected in the current frame (e.g., image 291), then the method 400 proceeds to step 403. Otherwise, the method of setting the initial keyframe 400 returns to the downloading step 401 to process a next input frame.

In one arrangement, the current frame may be binarised at the detecting step 402 to determine connected groups of dark pixels below a certain gray value threshold. In this instance, the contour of each group of dark pixels is extracted, and those groups of pixels surrounded by four straight lines are marked as potential markers. Four corners of every potential marker are used to determine a homography in order to remove perspective distortion. Once the internal pattern of a calibration marker is brought to a canonical front view, a grid of N×N binary values are determined. The binary values of the grid form a feature vector that is compared to the feature vector of the calibration marker pattern 298 by correlation. The output of the comparison is a confidence factor. If the confidence factor is greater than a pre-determined threshold, then the calibration marker pattern 298 is considered to be detected in the current frame at step 402.

In an alternative arrangement, instead of binarising the current frame using a fixed gray value threshold, at the detecting step 402, edge pixels may be detected using an edge detector. In this instance, the edge pixels are linked into segments, which in turn are grouped into quadrangles. The four corners of each quadrangle are used to determine a homography to remove the perspective distortion. An interior pattern is then sampled and compared to the feature vector of a known calibration marker pattern 298 by correlation. The calibration marker pattern 298 is considered to be found if the output of the comparison is greater than a pre-determined threshold.

Referring to FIG. 4A, in camera pose determination step 403, the processor 205 is used to determine the camera pose for the current frame (e.g., image 291) based on the known position and orientation of the calibration marker pattern 298 detected in the current frame at step 401 and on appearance of the detected calibration marker pattern 298.

In one arrangement, the four straight contour lines and the four corners of the calibration marker pattern 298 may be determined at pose calculating step 403 in a similar manner to step 402. The detected marker is then normalised using a perspective transformation given in Equation. (1), below. All variables in the transformation matrix are determined by substituting image coordinates and marker coordinates of the four vertices of the detected calibration marker pattern 298 for $(x_c, y_c)$ and $(X_m, Y_m)$, respectively.

$$\begin{bmatrix} hx_c \\ hy_c \\ h \end{bmatrix} = \begin{bmatrix} N_{11} & N_{12} & N_{13} \\ N_{21} & N_{22} & N_{23} \\ N_{31} & N_{32} & 1 \end{bmatrix} \begin{bmatrix} X_m \\ Y_m \\ 1 \end{bmatrix} \quad \text{(Eq. 1)}$$

where h is an arbitrary scale factor.

The normal vectors of the planes formed by two parallel lines of the calibration marker pattern 298 may then be determined. The equations of the two parallel lines in the image coordinates are given by Equation. (2), as follows:

$$a_1 x + b_1 y + c_1 = 0, a_2 x + b_2 y + c_2 = 0 \quad \text{(Eq. 2)}$$

where $a_1$, $b_1$ and $c_1$ as well as $a_2$, $b_2$ and $c_2$ are constant parameters for each of the parallel lines respectively.

Given that the moving camera 220 is pre-calibrated, the perspective project matrix P may be expressed as a 4×4 matrix, in accordance with Equation. (3), as follows:

$$P = \begin{bmatrix} P_{11} & P_{12} & P_{13} & 0 \\ 0 & P_{22} & P_{23} & 0 \\ 0 & 0 & 1 & 0 \\ 0 & 0 & 0 & 1 \end{bmatrix}, \quad \text{(Eq. 3)}$$

Accordingly, Equation (1) may be expressed in accordance with Equation (4) as follows:

$$\begin{bmatrix} hx_c \\ hy_c \\ h \\ 1 \end{bmatrix} = P \begin{bmatrix} X_c \\ Y_c \\ Z_c \\ 1 \end{bmatrix} \quad \text{(Eq. 4)}$$

where $(X_c, Y_c, Z_c)$ are the camera coordinates of a corner of the calibration marker pattern 298.

The equations of the planes that include the two sides of the calibration marker pattern 298, respectively, may be represented in accordance with Equation. (5), below, in the camera coordinates by substituting $x_c$ and $y_c$ in Equation. (3) for x and y in Equation. (2).

$$a_1 P_{11} X_c + (a_1 P_{12} + b_1 P_{22}) Y_c + (a_1 P_{13} + b_1 P_{23} + c_1) Z_x = 0,$$

$$a_2 P_{11} X_c + (a_2 P_{12} + b_2 P_{22}) Y_c + (a_2 P_{13} + b_2 P_{23} + c_2) Z_x = 0 \quad \text{(Eq. 5)}$$

From Equation. (5), the normal vectors of the planes including the two sides of the calibration marker pattern 298 are determined and represented by $n_1$ and $n_2$, respectively. The direction vector $v_1$ of the parallel two sides of the calibration marker pattern 298 is given by the outer product $n_1 \times n_2$. The second set of parallel lines may then be used to determine direction vector $v_2$. The two direction vectors $v_1$ and $v_2$ are refined to compensate for errors due to noise and image processing errors, such that $v_1$ and $v_2$ become exactly perpendicular.

A unit direction vector $v_3$ that is perpendicular to both $v_1$ and $v_2$ is also determined. The unit direction vectors $v_1$, $v_2$, and $v_3$ collectively form the rotation component of the transformation matrix T from marker coordinates to camera coordinates shown in Equation. (6), as follows:

$$\begin{bmatrix} X_c \\ Y_c \\ Z_c \\ 1 \end{bmatrix} = \begin{bmatrix} v_1^T & v_2^T & v_3^T & W_{3 \times 1} \\ 0 & 0 & 0 & 1 \end{bmatrix} \begin{bmatrix} X_m \\ Y_m \\ Z_m \\ 1 \end{bmatrix} \quad \text{(Eq. 6)}$$

Given the rotation component of the transformation matrix, the four corners of the marker in the marker coordinates, and the corresponding vertices of the detected marker in the current frame, eight equations (including translation component $W_{3 \times 1}$) are generated and the values of the translation component may be obtained from the eight equations. The transformation matrix T gives a rough estimation of the camera pose. It is important to note that, in the presence of image noise, motion blur, and inaccuracy of the camera calibration, the determined transformation matrix T based on a single image of the calibration marker pattern 298 is generally not sufficiently accurate for augmented reality systems.

Following step 403, at subsequent checking step 404 the processor 205 is used to check whether an initial keyframe (or key image) has been set. If the initial keyframe has been previously set, then the method 400 proceeds to the projecting step 406 as seen in FIG. 4B. In the present example, a determination at step 404 that the initial key-frame has been set means that the current frame is the image 292 of FIG. 2A. Otherwise, if the initial keyframe has not been set (i.e. this is the first time a calibration marker pattern 298 is detected), then in accordance with the present example the current frame is the image 291 and the method 400 proceeds to the setting step 405. At step 405, the processor 205 sets the current frame (e.g., image 291) as the initial keyframe, and the method 400 returns to the reading step 401 to read the next input frame (e.g., the image 292) from memory 206 and/or the hard disk drive 210.

At projection step 406, the processor 205 is used to project a set of corners from the known calibration marker pattern 298 to the initial keyframe (e.g., image 291) and the current frame (e.g., image 292) based on the camera poses determined in step 403, to estimate expected image coordinates of the calibration marker pattern 298. The set of corners from the known calibration marker pattern 298 is pre-determined and may be accessed at step 406 from the memory 206 or storage device 210. In another arrangement, the set of corners may also be accessed from disk storage medium 225 and/or the computer network (920 or 922). It is desirable that the set of corners from the known calibration marker pattern 298 are sparsely and evenly distributed over the entire area of the calibration marker pattern 298. In one arrangement, at least twenty (20) corner features are selected from the calibration marker pattern 298.

As described in detail below, in following steps 407 to 409 as seen in FIG. 4B, the processor 205 is used in the method 400 for determining a first image feature in a first image (e.g., the initial keyframe in the form of the image 291) corresponding to the feature of the calibration marker pattern 298 associated with the first image. The first image feature is determined based on a first pose of the camera 220 used to capture the first image. The processor 205 is then used for determining a second image feature in a second one (e.g., the image 292) of the plurality of images based on a second pose of the camera used to capture the second image, the second image feature having a visual match to the first image feature.

In detection step 407, the processor 205 is used to detect salient image features from the initial keyframe (e.g., image 291) and the current frame (e.g., image 292) using a corner detector. In one arrangement, a FAST-10 corner detector with non-maximal suppression may be used. Alternatively, a Harris corner detector, Moravec corner detector, SUSAN corner detector, SIFT, or SURF corner detector may also be used for detecting salient image features in the initial keyframe (e.g., image 291).

In an alternative arrangement, only image regions near the expected image coordinates of the corners of the calibration marker pattern 298 in the initial keyframe (e.g., image 291) and the current frame (e.g., image 292) determined in projecting step 406 are examined at step 407. The size of the image regions may be determined based on the size, position and orientation of the calibration marker pattern 298 and on the camera pose determined in step 403.

The method 400 then proceeds from the detecting step 407 to matching step 408, to determine matched image features corresponding to the corners of the calibration marker pattern 298 in the initial keyframe (e.g., image 291) and the current frame (e.g., image 292) stored in memory 206 and/or the hard disk drive 210.

A method 500 of determining matched image features, as executed at step 408, will now be described with reference to FIG. 5. The method 500 may be implemented as one or more code modules of the software application program 233 resident on the hard disk drive 210 and being controlled in its execution by the processor 205.

In a first selection step 510 of the method 500, the processor 205 is used to determine whether all corners of the calibration marker pattern 298 have been processed. If no more corners remain for processing, all matched image features of the corners between the initial keyframe (e.g., image 291) and the current frame (e.g., 292) are determined, and the method 500 concludes and the method 400 continues at the estimating step 409. Otherwise, the method 500 proceeds to determining step 520.

At the determining step 520, the processor 205 is used to determine a set of candidate salient image features in the initial keyframe (e.g., image 291) corresponding to the corner of the calibration marker pattern 298. The set of candidate salient image features is determined based on Euclidean distance of the salient image feature from expected image coordinates of the selected corner determined in step 406.

In one arrangement, a circular search region may be defined with a radius of ten (10) pixels centred at the expected image coordinates of the selected corner. Any salient image feature found in the circular search region is considered to be a potential candidate for the location of the projected corner. In an alternative arrangement, a rectangular search region may be used, and the dimension of the rectangular search region may depend on the position and orientation of the estimated camera pose determined in step 403.

Following the step 520, at subsequent checking step 530 the processor 205 is used to check whether any candidate image features remain for processing. If all candidate image features are processed, then the method 500 returns to checking step 510 to process the next corner of the calibration marker pattern 298. Otherwise, the method 500 proceeds to step 540.

In matching step 540, each selected candidate image feature determined at step 520 from the initial keyframe is matched against a set of image features in the current frame stored within memory 206 and/or the hard disk drive 210. The set of image features in the current frame to be matched is determined based on Euclidean distance of the image feature from the expected image coordinates of the selected corner determined in step 406. Following step 540, the method 500 returns to step 530 and step 540 is repeated until the best match feature is found for a given corner currently processed.

In one arrangement, 8×8 patches centred at the location of the salient image feature in both the initial keyframe and the current frame are extracted at step 540. The 8×8 patches are then matched using zero-mean sum of squared differences (ZSSD) measure. The pair of image features with the highest ZSSD score is selected as the best match for the current corner of the calibration marker pattern 298. Alternatively, the pair of image features which is closest to the expected image coordinates of the selected corner and has a ZSSD score above a pre-determined threshold is selected as the best match for the current corner of the calibration marker pattern 298.

In an alternative arrangement, a different patch size such as a 16×16 or 32×32 patch and a different similarity measure, such as sum of squared differences (SSD) or sum of absolute differences (SAD), may be used for matching the selected candidate image feature with the set of image features in the current frame at the finding step 540.

Referring back to FIG. 4B, the method 400 proceeds to the estimating step 409, which follows the determining step 408. At the estimating step 409, the processor 205 is used for determining a reconstructed position of the feature of the calibration marker pattern 298 based on positions of the first and second image features, the first camera pose and the second camera pose.

At estimating step 409, the processor 205 is used to estimate the 3D position of the corners of the calibration marker pattern 298 by triangulation based on the image coordinates of the match features corresponding to corners of the calibration marker pattern 298 determined in step 408 and the relative pose between the initial keyframe (e.g., image 291) and the current frame (e.g., image 292). The relative camera pose is determined based on the camera poses of the initial keyframe and the current frame determined in step 403 of the method 400.

In one arrangement, linear triangulation is performed at step 409. For example, given two observations, x and x' of a point X in space and the projection matrices P and P' for the initial keyframe (e.g., image 291) and the current frame (e.g., image 292) respectively, the depth of the point X may be determined in accordance with Equations (7) and (8):

$$x = PX \quad \text{(Eq. 7)}$$

$$x' = P'X \quad \text{(Eq. 8)}$$

$$P = K[R|t] = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} = \begin{bmatrix} p^{1T} \\ p^{2T} \\ p^{3T} \end{bmatrix}$$

By taking cross product in Eq. 7, $$x \times (PX) = PX \times PX = 0 \quad \text{(Eq. 9)}$$

Equation. (9) may be re-written as three linear equations, as follows:

$$u(p^{3T}X) - (p^{1T}X) = 0$$

$$v(p^{3T}X) - (p^{2T}X) = 0$$

$$u(p^{2T}X) - v(p^{1T}X) = 0$$

where $p^{iT}$ are the rows of the projection matrix P. An equation of the form AX=0 may then be composed in accordance with Equation. (10), as follows $$A = \begin{bmatrix} up^{3T} - p^{1T} \\ vp^{3T} - p^{2T} \\ u'p'^{3T} - p'^{1T} \\ v'p'^{3T} - p'^{2T} \end{bmatrix} \quad \text{(Eq. 10)}$$

The four equations of Equation. (10) with four homogenous unknowns may be solved by performing Singular Value Decomposition (SVD) according to Equation. (11), as follows.

$$A = U\Sigma V^T \quad \text{(Eq. 11)}$$

where U and V are 4×4 matrices, $V^T$ is a conjugate transpose of V, and Σ is a 4×4 diagonal matrix. A solution X of Equation (11) corresponds to the last column of the matrix V.

In one arrangement, an iterative or non-iterative algorithm that minimises a suitable cost function such as a Sampson distance measure may be used to determine the 3D positions of the corners of the calibration marker pattern 298.

The method 400 then proceeds from estimating step 409 to determining step 410, where the processor 205 is used for determining a 3D reconstruction error in a 3D space based on the reconstructed position of the feature of the calibration marker pattern 298. The reconstruction error is determined for each corner of the calibration marker pattern 298. The reconstruction error for each corner may be stored by the processor 205 within memory 206 and/or the hard disk drive 210. In one arrangement, the reconstruction error is measured in the constructed coordinate system of an augmented reality system. For example, with reference to FIG. 6, the reconstruction error 601 is the Euclidean distance between actual position of a corner of the pattern $X_{marker}$ and the position of reconstruction $X_{reconst}$ 602 determined in step 409. The reconstructed position $X_{reconst}$ 602 of such a corner of the pattern $X_{marker}$ is based on matched calibration features and relative camera pose. As seen in FIG. 6, due to on inaccuracy, noise and motion blur, camera poses (e.g., 603) may be inaccurate. FIG. 6 shows observed corner features 604 (i.e., $x_L$ and $x_R$), and projected corners 605 (i.e., $\hat{x}_2$ and $\hat{x}_R$). The projected corners (e.g., 605) may be determined based on determined camera pose. The actual position of a corner of the pattern $X_{marker}$ is a pre-determined position, which may be given as an input during map initialisation. In one implementation, the actual position of the pattern $X_{marker}$ is fed in during the map initialisation step by a user. In another implementation, the actual position of the pattern $X_{marker}$ is obtained through a geo-tagged beacon received by the computer module 201, which determines the actual location based on the received beacon.

In the following steps 411 to 413, the processor 205 is used for selecting a first image (i.e., in the form of the current frame) for constructing a coordinate system of an augmented reality system in an event that the determined reconstruction error satisfies a pre-determined criterion for scene reconstruction. In decision step 411, the processor 205 is used to determine whether quality of the 3D reconstruction of the corners of the calibration marker pattern 298 is satisfactory. If the quality of the reconstruction is satisfactory, the method 400 proceeds to setting step 412 to set the current frame (e.g., image 292) as a keyframe. Otherwise, the method 500 proceeds to decision step 415.

In one arrangement, the quality of the 3D reconstruction of the corners of the calibration marker pattern 298 is considered to be satisfactory if:

1) the reconstruction error indicates that the reconstruction of a corner is successful (i.e., if the reconstruction error of the corner is less than a first threshold $T_1$); and 2) the number of corners successfully reconstructed is larger than a second threshold $T_2$.

In an alternative arrangement, the threshold $T_1$ is not fixed. The threshold $T_1$ may be dynamically adjusted depending on the required accuracy of an augmented reality system implementing the described methods, as set by user of the system.

In a further arrangement, the quality criteria of the 3D reconstruction may be based on mean and variance of the reconstruction errors of the corners of the calibration marker pattern 298.

The method 400 then proceeds to step 412. Since the quality of the reconstructed corners of the calibration marker pattern 298 are determined in step 411 to be satisfactory, at step 412, the processor 205 is used to set the current frame (e.g., image 292) stored within the memory 206 and/or the hard disk drive 210 as a second keyframe. The initial keyframe (e.g., image 291) and the current frame (e.g., image 292) form a stereo image pair to be used in map initialisation step 413 to construct an initial 3D map (e.g., map 295 as seen in FIG. 7).

Following step 412, at constructing step 413 of the method 400, the processor 205 is used to perform map initialisation to construct a map of the scene 293, within memory 206 and/or the hard disk drive 210, based on the initial keyframe (e.g., image 291) and the second keyframe (i.e., the current frame) (e.g., image 292). A set of natural image features, including those from 3D spherical object 299 and 3D square object 297 of FIGS. 2A and 3, are extracted from the initial keyframe (e.g., image 291) using a corner detector such as a FAST-10 corner detector. Alternatively, a Harris corner detector, Moravec corner detector, SUSAN corner detector, SIFT, or SURF corner detector may also be used for detecting corners in the initial key-frame (e.g., image 291). Also at map initialization step 413, the processor 205 is used to perform an epi-polar search to determine the feature correspondences in the current frame (e.g., image 292) based on the relative camera pose determined in estimating step 409. Given the relative camera pose between a pair of stereo images, such as the images 291 and 292, a point in one image corresponds to a so-called epi-polar line in the second image. Patch search is performed to locate the match point along the epi-polar line. The processor 205 is then used to perform triangulation at step 413 to determine the 3D coordinates of the corners corresponding to those natural image features based on the determined image coordinates of the feature correspondences and the relative camera pose. The output of step 413 is an initial 3D map, which according to the example of FIG. 2A is the 3D point cloud map 295 as seen in FIG. 7. The 3D map 295 constructed in accordance with the method 400 may be stored within the memory 206 and/or hard disk drive 210. The calibration marker pattern can be removed from the scene after the 3D point cloud 295 is generated by the process 400.

In one arrangement, the method 400 uses all detected corner features in the initial keyframe for map initialisation, to generate a very dense 3D map 295.

In an alternative arrangement, only a subset of the detected corner features in the initial keyframe is selected for map initialisation. The number of selected image features may be limited to a pre-defined threshold value, and the selected features are sparsely and evenly distributed in the initial keyframe.

If the quality of the reconstruction of the corners is poor at decision step 411, then the method 400 continues from step 411 to decision step 415 as seen in FIG. 4C. At step 415, the processor 205 is used to determine whether the amount of time elapsed since the initial keyframe is captured exceeds a pre-determined threshold T. If the time elapsed since the initial keyframe is captured is less than the threshold T, then the method 400 returns to step 401 of the method 400 to process the next input frame. Otherwise, the method 400 proceeds to decision step 416.

In step 416 of the method 400, the processor 205 is used to determine whether the threshold T is smaller than a pre-determined threshold value, MAX, stored within the memory 206 and/or the hard disk drive 210. If the current value of T is smaller than MAX, then the method 400 proceeds to setting step 417 and the threshold T is doubled to handle slow camera motion. In contrast, if the threshold T is larger than or equal to MAX, then map initialisation is determined to have failed and the method 400 proceeds to setting step 419. At setting step 419, the threshold T is re-initialised to a default setting value, DEFAULT.

Following steps 417 and 419, a subsequent setting step 418 sets the current frame (e.g., image 292) as the initial keyframe, and the method 400 returns to step 401 to process the next input frame.

In one further arrangement, the video system 200 in FIG. 2A provides a visual and/or audible indication of the distance and the direction of the moving camera 220 required for successful map initialisation. The visual and/or audible indication may be provided, for example, via the video display 214 and/or the loudspeakers 217. Given that an initial keyframe has been selected by the method 400, the moving camera 220 should be moved side-ways by a certain distance from the position of the initial keyframe to satisfy a stereo baseline requirement. Stereo baseline is related to scene depth which is, in this case, the distance between the moving camera 220 at the position of the initial keyframe and the calibration marker pattern 298. The relationship between the stereo baseline and scene depth is often determined experimentally and, in one arrangement, the stereo baseline distance is set approximately equal to one-tenth of the scene depth. Alternatively, the quality of the reconstruction determined at step 411 may also be used to estimate the camera movement for successful map initialisation. Reconstruction error (i.e. depth resolution) is approximately inversely proportional to the baseline distance for a scene of a given depth. The processor 205 can therefore estimate the required camera movement from a current position of the moving camera by multiplying the baseline distance with the estimated reconstruction errors determined at step 411 and then dividing the result of the multiplication by the desired level of reconstruction errors. The direction of the camera movement is restricted to be in parallel to the surface of the calibration marker pattern 298.

Figure 8:
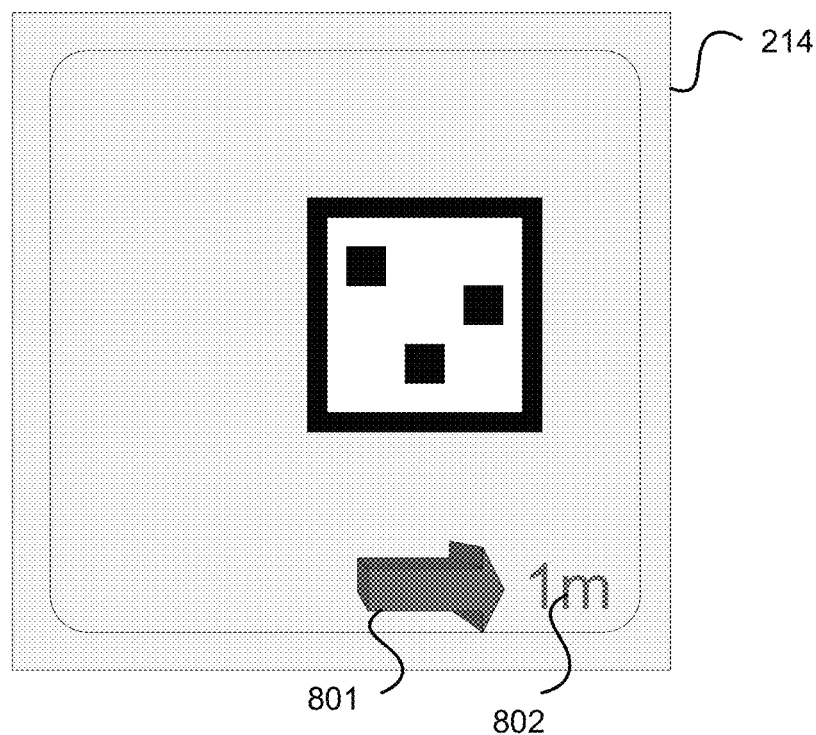
FIG. 8 shows the video display of FIG. 2A during map initialisation.

The method 400 will now be further described by way of example. In one example, the method 400 may be used for an indoor navigation system, where the mapping of newly observed objects in a scene and localising camera poses (i.e. position and orientation) from tracked objects are performed in parallel in real-time. In such an indoor navigation application, a user looks at an indoor scene such as inside a demonstration home ("demo home") through a capture-display device such as a camera phone or an optical see-through head mounted display (HMD). The user may firstly initialise the indoor navigation system by looking directly towards a calibration marker pattern, such as the calibration marker pattern 298 shown in FIG. 1A or 1B. In this instance, the calibration marker pattern defines the scale of the visible objects and the global coordinate system in the scene. The calibration marker pattern may appear, for example, on the main entrance door, on the floor near the entrance, or on top of a shoe shelf at the demo home. The indoor navigation system may then automatically detect the presence of the calibration marker pattern in the captured images, in accordance with the method 400, and provide the first image with the detected calibration marker pattern as an initial keyframe. The video system 200 may provide visual and audio instructions for the desired user movement for map initialisation if the reconstruction error does not satisfy the predetermined criterion. For example, FIG. 8 shows a blinking arrow 801 and text 802 showing the direction and estimated distance (i.e., 1 m) of desired user movement at the bottom right-hand corner on the video display 214. At the same time, the processor 105 may cause the loudspeakers 217 to produce an instruction such as "Move sideway to the left by 1 m". As the user enters the demo home through the entrance while looking at the calibrated marker pattern, one of the subsequent images may be selected in accordance with the method 400 for map initialisation.

Continuing the demo home example, once the second keyframe is determined in accordance with the method 400 (i.e., as at step 412), natural features (e.g. corner points) are extracted from both the initial and second keyframes. Feature matching is then performed based on learnt epi-polar geometry derived from the calibration marker pattern. The 3D location of points in space is determined based on the known epi-polar geometry. Pairs of feature correspondences are also determined by triangulation. The initial 3D map of the scene within the demo home is then generated (as at step 413). The calibrated marker pattern is not required for later tracking and localisation.

Any suitable parallel tracking and mapping algorithm may then be performed to keep track of the existing objects in the 3D map generated for the demo home. Such a parallel tracking and mapping algorithm may be used to determine the current camera pose (position and orientation) based on locations of detected features and corresponding map points. Newly detected natural features may be added into the generated 3D map as the user moves further into the demo home and enters into unexplored regions of the environment. Such an indoor navigation system may overlay supplementary text information or synthetic objects onto images. The supplementary text information may show current position of the user in terms of the global coordinate system and the distance travelled since an initial user position. Synthetic objects may include paintings on the walls, furniture, household appliances, and even a virtual ocean-view when the user looks out from the windows or balcony of the demo home.

The methods described above may be used for product design. As an example, a textured cube with a calibrated marker pattern (e.g., the calibrated marker pattern 298) on one side of the cube. In this instance, a designer may firstly initialise an augmented reality (AR) system by looking at the calibrated marker pattern through a camera phone or a head mounted display (HMD) and moves the textured cube to a new location. A pair of keyframes may be determined for generating the initial map as described above. Computer graphics representing, for example, a photocopier may be superimposed into the images when viewed through the camera phone or head mounted display. The designer may move about or rotate the cube to inspect the design from different viewing angles and positions. Buttons on synthetic printers may then be selected to see a computer animation that simulates the operation of the photocopier in response to the button selections.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:
1. A method of selecting a key image from a plurality of images to construct a coordinate system of an augmented reality system, the method comprising:
   determining a first image feature in a first one of the plurality of images corresponding to a marker, wherein the first image feature is determined based on a first camera pose of a camera used to capture the first image at a first location;
   determining a second image feature in a second one of the plurality of images captured by the camera at a second location, wherein the second image feature is based on a second camera pose of the camera and the second image feature includes a visual match to the first image feature;
   determining a reconstructed position of the marker in a three dimensional (3D) space based on a position of the first image feature in the first image, a position of the second image feature in the second image, the first camera pose, and the second camera pose;
   determining a reconstruction error based on the determined reconstructed position of the marker and a pre-determined position of the marker in the 3D space; and
   selecting at least one of the first image and second image as the key image for constructing the coordinate system of the augmented reality system in an event that the determined reconstruction error satisfies a pre-determined criterion for constructing the coordinate system.

2. A method according to claim 1, wherein the pre-determined criterion is dynamically adjusted depending on an accuracy of the augmented reality system set by a user of the augmented reality system.

3. A method according to claim 1, wherein the pre-determined criterion is dynamically adjusted depending on a mean and a variance of the reconstruction error of a feature of a marker.

4. A method according to claim 1, wherein the reconstruction error is measured in the constructed coordinate system of the augmented reality system.

5. A method according to claim 1, further comprising removing the marker from a scene after selecting the first image for constructing the coordinate system of the scene.

6. A method according to claim 1, wherein the first image and the second image are captured by a multi-view camera system comprising a plurality of cameras.

7. A method according to claim 1, further comprising producing an instruction for a user movement in response to the reconstruction error not satisfying the pre-determined criterion.

8. An apparatus for selecting a key image from a plurality of images to construct a coordinate system of an augmented reality system, the apparatus comprising:
- a memory for storing data and computer program;
- a processor coupled to the memory for executing the computer program, the computer program comprising instructions for:
- determining a first image feature in a first one of the plurality of images corresponding to a marker, wherein the first image feature is determined based on a first camera pose of a camera used to capture the first image at a first location;
- determining a second image feature in a second one of the plurality of images captured by the camera at a second location, wherein the second image feature is based on a second pose of the camera and the second image feature includes a visual match to the first image feature;
- determining a reconstructed position of the marker in a three dimensional (3D) space based on a position of the first image feature in the first image, a position of the second image feature in the second image, the first camera pose, and the second camera pose;
- determining a reconstruction error based on the determined reconstructed position of the marker and a pre-determined position of the marker in the 3D space; and
- selecting at least one of the first image and second image as the key image for constructing the coordinate system of the augmented reality system in an event that the determined reconstruction error satisfies a pre-determined criterion for constructing the coordinate system.

9. A non-transitory computer readable medium storing a computer program to cause an apparatus to perform a method for selecting a key image from a plurality of images for constructing a coordinate system of an augmented reality system, the method comprising:
- determining a first image feature in a first one of the plurality of images corresponding to a marker, wherein the first image feature is determined based on a first pose of a camera used to capture the first image at a first location;
- determining a second image feature in a second one of the plurality of images captured by the camera at a second location, wherein the second image feature is based on a second pose of the camera and the second image feature includes a visual match to the first image feature;
- determining a reconstructed position of the marker in a three dimensional (3D) space based on positions of the first image feature in the first image and second image feature in the second image, and the first and second camera pose;
- determining a reconstruction error based on the determined reconstructed position of the marker and a pre-determined position of the marker in the 3D space; and
- selecting at least one of the first image and second image as the key image for constructing the coordinate system of the augmented reality system in an event that the determined reconstruction error satisfies a pre-determined criterion for constructing the coordinate system.

10. A method of selecting a key image from a plurality of images to construct a coordinate system of an augmented reality system, the method comprising:
- determining a first image feature in a first image captured in a first camera pose, wherein the first image feature corresponds to a feature in a three dimensional (3D) space;
- determining a second image feature in a second image captured in a second camera pose, wherein the second image feature corresponds to the feature in the three dimensional (3D) space;
- determining a reconstructed position of the feature in the three dimensional (3D) space based on a position of the first image feature in the first image, a position of the second image feature in the second image, the first camera pose, and the second camera pose;
- determining a reconstruction error based on the determined reconstructed position of the feature and a pre-determined position of the feature in the 3D space; and
- selecting at least one of the first image and second image as the key image for constructing the coordinate system of the augmented reality system in an event that the determined reconstruction error satisfies a pre-determined criterion for constructing the coordinate system.

11. A method according to claim 10, wherein the pre-determined criterion is dynamically adjusted depending on an accuracy of the augmented reality system set by a user of the augmented reality system.

12. A method according to claim 10, wherein the pre-determined criterion is dynamically adjusted depending on a mean and a variance of the reconstruction error of a feature of a marker.

13. A method according to claim 10, wherein the reconstruction error is measured in the constructed coordinate system of the augmented reality system.

14. A method according to claim 10, further comprising removing a marker from a scene after selecting the first image for constructing the coordinate system of the scene.

15. A method according to claim 10, wherein the first image and the second image are captured by a multi-view camera system comprising a plurality of cameras.

16. A method according to claim 10, further comprising producing an instruction for a user movement in response to the reconstruction error not satisfying the pre-determined criterion.

17. An apparatus for selecting a key image from a plurality of images to construct a coordinate system of an augmented reality system, the apparatus comprising:
- a memory for storing data and computer program;
- a processor coupled to the memory for executing the computer program, the computer program comprising instructions for:
- determining a first image feature in a first image captured in a first camera pose, wherein the first image feature corresponds to a feature in a three dimensional (3D) space;

determining a second image feature in a second image captured in a second camera pose, wherein the second image feature corresponds to the feature in the three dimensional (3D) space;

determining a reconstructed position of the feature in the three dimensional (3D) space based on a position of the first image feature in the first image, a position of the second image feature in the second image, the first camera pose, and the second camera pose;

determining a reconstruction error based on the determined reconstructed position of the feature and a pre-determined position of the feature in the 3D space; and selecting at least one of the first image and second image as the key image for constructing the coordinate system of the augmented reality system in an event that the determined reconstruction error satisfies a pre-determined criterion for constructing the coordinate system.

18. A non-transitory computer readable medium storing a computer program to cause an apparatus to perform a method for selecting a key image from a plurality of images to construct a coordinate system of an augmented reality system, the method comprising:

determining a first image feature in a first image captured in a first camera pose, wherein the first image feature corresponds to a feature in a three dimensional (3D) space;

determining a second image feature in a second image captured in a second camera pose, wherein the second image feature corresponds to the feature in the three dimensional (3D) space;

determining a reconstructed position of the feature in the three dimensional (3D) space based on a position of the first image feature in the first image, a position of the second image feature in the second image, the first camera pose, and the second camera pose;

determining a reconstruction error based on the determined reconstructed position of the feature and a pre-determined position of the feature in the 3D space; and selecting at least one of the first image and second image as the key image for constructing the coordinate system of the augmented reality system in an event that the determined reconstruction error satisfies a pre-determined criterion for constructing the coordinate system.

* * * * *